E. BUNCE.
Seed-Planter.
No. 841.
Patented July 16, 1838.
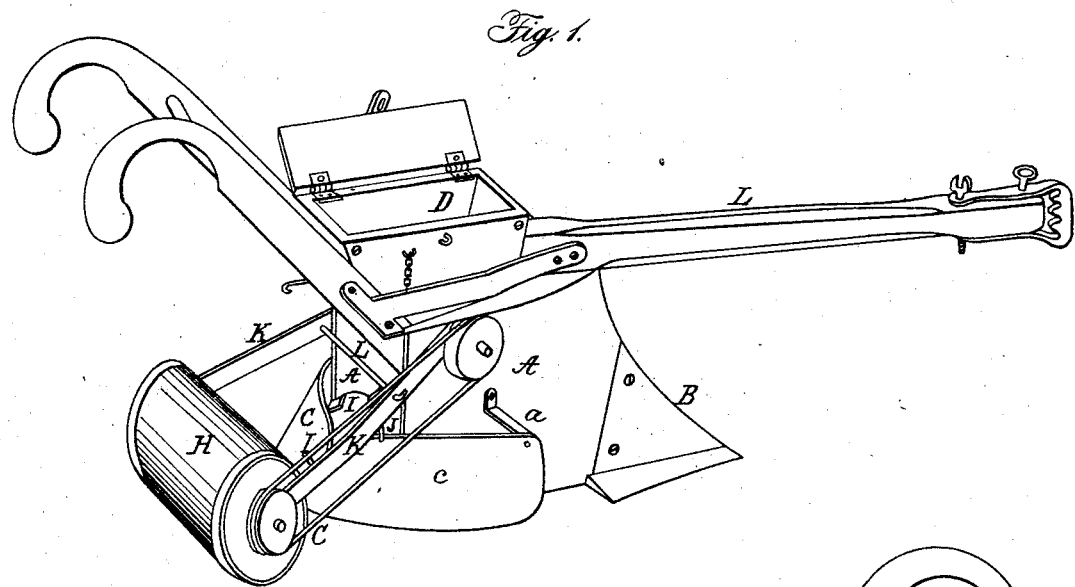
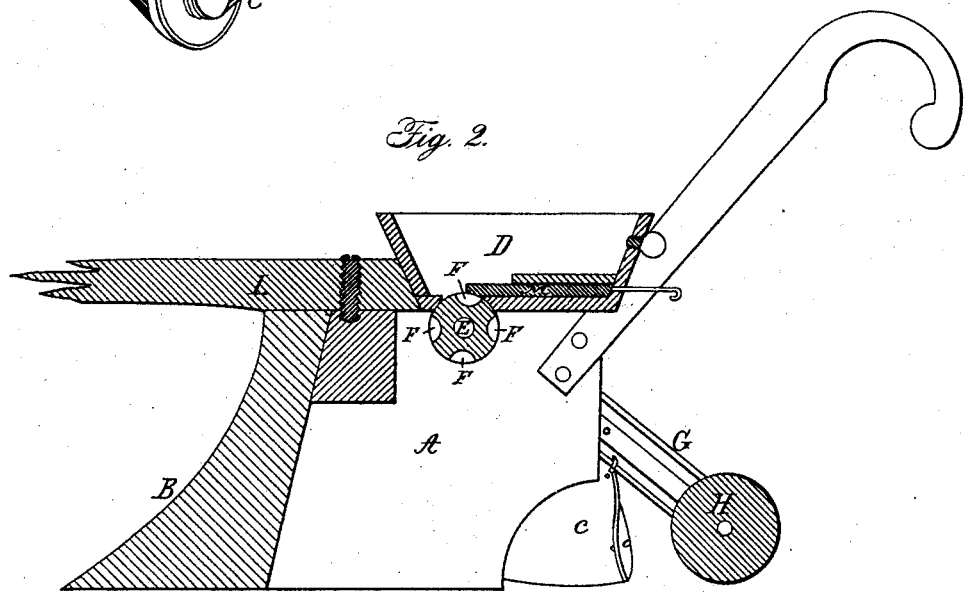

UNITED STATES PATENT OFFICE.

ELISHA BUNCE, OF WESTFORD, MASSACHUSETTS.

IMPROVEMENT IN THE MACHINE FOR PLANTING CORN AND OTHER SEEDS.

Specification forming part of Letters Patent No. 841, dated July 16, 1838.

*To all whom it may concern:*

Be it known that I, ELISHA BUNCE, of Westford, in the county of Middlesex and Commonwealth of Massachusetts, have invented a new and useful improvement on the plow and planting machines for plowing, dropping seed, covering, and rolling down the same after being covered, all being done at the same time, of which the following is a specification.

The improvement is as follows:

The mold-boards A are made alike, one on each side, united on the front edge, and nearly perpendicular at the hind part, in such a manner as not to throw the dirt away from the same more than can be helped. The point B of the plow is also made like the point of all double-mold-board plows, and is fastened to the plow with suitable bolts. There are also two pieces of iron, called "coverers," C C, placed at a suitable distance from the sides of the plow in such a manner as to take the dirt which is turned up by the plow and carry it behind the plow and cover the seed which has fallen from the box D or hopper on the plow. Under this box there is a roller, E, with holes F, or creases cut in the same, to receive the seed and discharge them when turned by a belt, G, connected with the covering-roller H, which rolls over the earth which covers the seeds.

The coverers are fastened one on each side of the plow, as at $a$, Fig. 1, and are connected together by a rod of iron, I, behind the plow. The coverers are crooked, and the bottoms of the hind part of the coverers are turned out or back to clear them from dirt. The back ends are sustained by two small hooks, J, one to each, near the hind part of the mold-boards. The hooks project out a sufficient length for the brace-bar to rest upon, the hooks, when the plow is swung round, at the same time preventing the roller from swinging beneath the plow.

The beam L is fastened on the top of the plow in the center in front of the box by a bolt, or in any of the well-known modes.

The roller H is connected with the plow by two pendulous rods, K K, the gudgeons of the roller H passing through holes in their lower ends and the gudgeons of the seed-roller E through holes in their upper ends. These rods are kept at proper distances apart by a brace-rod, N. This arrangement will enable the roller to pass over the uneven surface of the earth. There is a slide, M, in the bottom of the hopper, which slides over the seed-roller for the purpose of closing the opening which admits the seed to the grooves in the seed-rollers.

What I claim as my invention, and desire to secure by Letters Patent, is—

The combination of the double plow, constructed as herein described, with the seed-roller E, coverers C, and roller H, in their combination as hereinbefore described.

ELISHA BUNCE.

Witnesses:
 JULIAN ABBOT,
 J. W. P. ABBOT.